Nov. 8, 1960 T. A. WETZEL 2,959,452
SLIDE AND WAY STRUCTURE
Filed Aug. 8, 1956 2 Sheets-Sheet 1
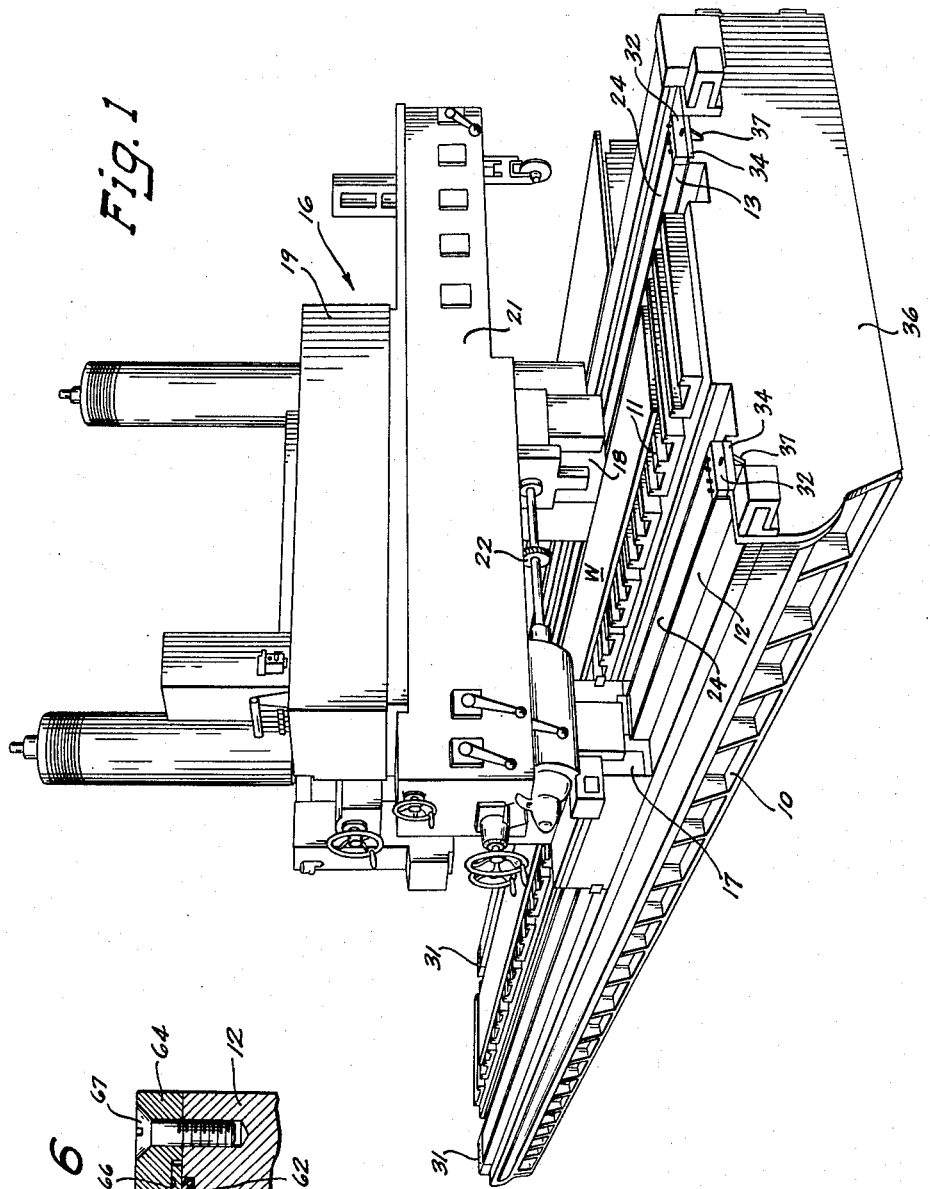
INVENTOR.
Theodore A. Wetzel
BY
Elroy J. Wutschel
Attorney Nov. 8, 1960
T. A. WETZEL
2,959,452
SLIDE AND WAY STRUCTURE
Filed Aug. 8, 1956
2 Sheets-Sheet 2
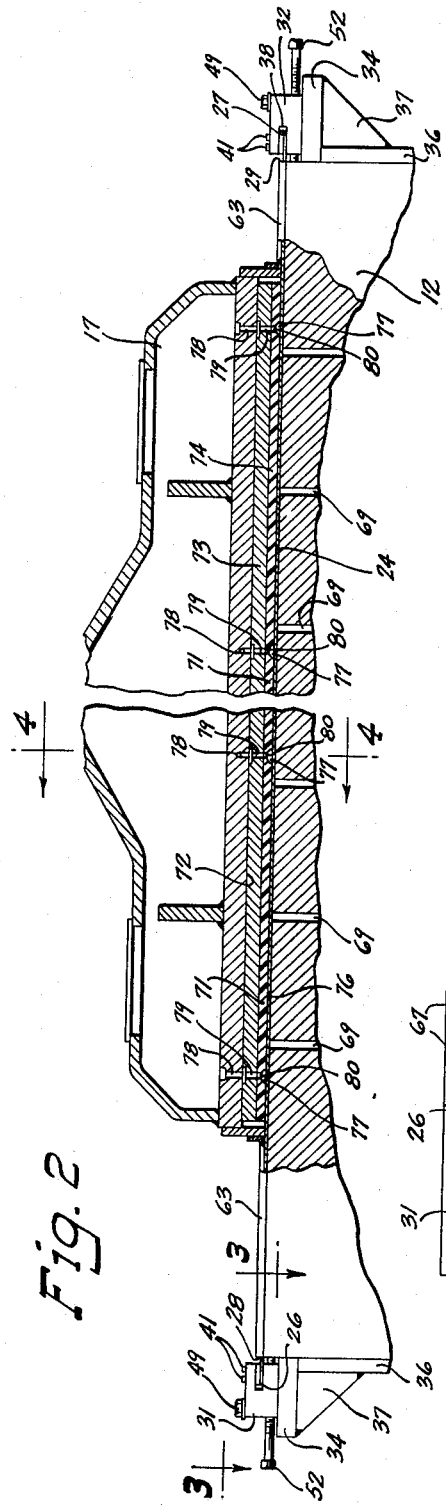
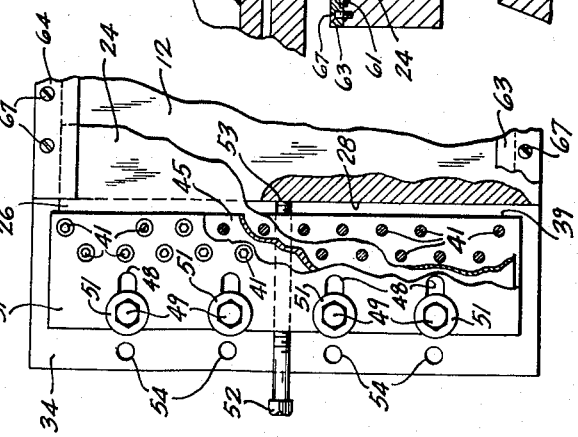
INVENTOR.
Theodore A. Wetzel
BY
Elroy J. Wutschel
Attorney United States Patent Office 2,959,452
Patented Nov. 8, 1960

2,959,452

SLIDE AND WAY STRUCTURE

Theodore A. Wetzel, Brookfield, Wis., assignor to Kearney & Trecker Corporation, West Allis, Wis., a corporation of Wisconsin Filed Aug. 8, 1956, Ser. No. 602,796

9 Claims. (Cl. 308—3)

This invention relates generally to improvements in machine tools and particularly to improvements in guides and bearing means for a supporting member and a reciprocating member thereon.

This invention will be described in connection with a gantry type milling machine but it is to be understood that the invention is not limited thereto, but has equal application to any relatively long supporting surface adapted to slidably support a large and heavy movable member.

As is well known, the trend in the construction of machine tools is toward large machines having high feed rates. In gantry type milling machines the base or bed thereof may extend ninety feet or more in length while the gantry itself which is slidably movable over this length may weight sixty tons or more and is required to travel at rates of three hundred inches or more per minute. The weight and feed movement results in the generation of friction heat between the gantry slide member or shoes and the bed ways causing warpage which results in inaccuracy in the machine tool. Another difficulty encountered, is the flash welding to the gantry shoes of impurities, such as chips and the like, which may collect on the bed ways and are picked up by the shoes of the gantry during its movement, resulting in the scoring of the bed ways when both members are metallic. Still another problem is the replacement or repair of the way surfaces of the bed due to wear or damage.

In the past it has been customary to construct the ways of the bed integrally therewith, surface harden the supporting surface, and finish it by machining or grinding it as smooth as possible. This was possible with relatively small machines, but even then the surface finish produced would have micro-scratches or a surface characterized by sharp peaks and valleys caused by the cutting action of the grinding wheel or cutter. Such surface would offer resistance to the movement of the movable member. Even if such ground ways were provided, damage and wear thereto would be extremely costly to repair. Another method of providing a way is to construct the bed with an integral way support and to secure to the support a plurality of hardened and finished bearing plates. These hardened and finished plates are matched in abutting relationship and the joint between adjacent plates is ground to equalize them. This method has some of the same disadvantages that the integrally formed way surfaces possess, in that the finished bearing surface still has the micro-scratch surface of sharp peaks and valleys and the joints between the plates, no matter how finely finished, also presents a lip to offer an additional resistance factor to the passage of the movable member thereover. However, the separate bearing plate construction is an improvement over the integrally formed surface, in that the plates may be replaced when damaged or worn. The surfaces of the plates, of course, are normally finished after they have been placed on the machine which is a costly and time consuming process. The gantry or movable member must also be adjusted to the dimension of the new plates when their replacement or refinishing becomes necessary.

It has also been proposed to provide the movable member with non-metallic bearing plates to minimize the friction between the movable member and the relatively fixed member. This, in conjunction with the replaceable hardened and finished bearing plates of the bed support, does minimize the effect due to friction heat, but still is not entirely satisfactory. The non-metallic bearing surface, in moving over the ground or machined finished surface of the bed way is eroded or abraded due to the joints between adjacent plates and to the sharp peak and valley surface condition imparted by machining or grinding the plates. This, of course, causes undue wear on the non-metallic bearing plate, necessitating frequent replacement.

It is therefore, the principal object of the present invention to provide a way surface for a machine tool which presents a continuous unbroken surface and has a smooth rolled surface devoid of sharp peaks and valleys.

Another object of the present invention is to provide a way surface for a machine tool that is easily applied, relatively simple to replace, and which is inexpensive.

Another object of the present invention is to provide a continuous bearing way surface for a relatively long supporting member of a machine tool and to provide a non-metallic bearing plate for a movable member associated therewith which combination minimizes the friction heat generated by the movable member travelling over the fixed member.

Still another object of the invention is to provide a removable ribbon way strip for a supporting member of a machine tool.

A further object of the present invention is to provide a way surface for a way support of a machine tool that conforms to the supporting surface of the way support.

Another object of the invention is to provide effective means for preventing the build-up of hydrostatic pressure between a supporting surface and a way surface thereon.

Other objects and advantages of the present invention will become more readily apparent from the following description of an illustrative embodiment of the present invention shown in the accompanying drawings, in which:

Figure 1 is a perspective view of a gantry type milling machine having embodied therein the improvements of this invention;

Fig. 2 is an enlarged fragmentary view in vertical section, taken longitudinally through one of the gantry shoes and its associated way support of the machine tool of Fig. 1;

Fig. 3 is an enlarged plan view of a ribbon way strip tensioning block with parts broken away to show the various parts, and taken generally along the plane represented by the line 3—3 in Fig. 2;

Fig. 4 is an enlarged fragmentary view in transverse vertical section of the way support, the ribbon way strip and the gantry shoe taken generally along the plane represented by the line 4—4 in Fig. 2;

Fig. 5 is an enlarged detailed view in vertical section of a ribbon way strip tensioning block shown in Fig. 2; and, Fig. 6 is an enlarged detailed fragmentary view in transverse vertical section of one of the sealing means employed to seal the space between the ribbon way strip and the way supporting base.

Throughout the several views of the drawings, similar reference characters are employed to denote the same or similar parts.

The gantry type milling machine illustrated in Fig. 1 comprises an elongated supporting bed 10 having a work supporting surface 11 to which a workpiece W is secured. The bed 10 is provided with a pair of integrally formed elongated way supports 12 and 13 which extend the entire length of the bed. Movably mounted on the bed 10 is a gantry 16 having a pair of slide members or shoes 17 and 18 which are slidably received on the bed way supports 12 and 13, respectively. The shoes 17 and 18 are connected at their top ends by a cap member 19. A rail 21 is slidably supported on the gantry 16 for vertical movement thereon and has a cutting tool 22 which operates upon the workpiece W. The gantry 16 is reciprocated along the entire length of the bed 10 by any well known means, such as a gear and rack mechanism (not shown).

In the past the way supports 12 and 13 of the bed 10 and the bearing plates of the gantry shoes 17 and 18 have been formed of metal thereby resulting in a metal to metal sliding surface. The way supports 12 and 13 of the bed 10 were, as previously mentioned, provided with hardened matched plates bolted or otherwise secured to the top surfaces of the way supports so as to present a bearing surface on which the gantry shoes were slidably supported. In order to reduce the friction heat generated and to minimize the scoring of the bed way surfaces the gantry shoes have been provided with non-metallic bearing plates that improve the conditions somewhat. However, the substitution of a non-metallic bearing plate for the metallic bearing plate in the gantry shoe is not entirely satisfactory. The non-metallic bearing plate in passing over the conventionally constructed bed guideway will abrade due to the surface finish of the plates and their abutment joints. Also, it does not solve the problem of replacement or pair of the surface when it becomes worn or damaged to the extent that it impairs the accuracy of operation of the machine tool.

To this end, the bed way supports 12 and 13 of the illustrated machine tool are constructed to predetermined desired dimensions which dimensions are maintained during the life of the machine tool as no direct wear occurs thereto. Since each of the way supports 12 and 13 are constructed and treated identically a description of one, with its associated structure, will suffice for both. To the top supporting surface of the way support 12, as best shown in Figs. 2 and 4, there is applied or overlayed a continuous ribbon way strip 24 of a hardened metallic material that presents a smooth unbroken bearing surface characterized by a rolled surface as compared to the finished surface of sharp peaks and valleys produced by machining or grinding. For this purpose it has been found that a material that can be used for these ribbon way strips is a stainless steel which has been cold rolled to size, since as furnished from the mill it possesses, due to work hardening, the desirable wearing qualities and the necessary rolled surface smoothness. The ribbon way strip 24 covers substantially the entire top surface of the way support 12, as shown in Fig. 4, and is of a length so that its ends 26 and 27 extend beyond the ends 28 and 29 of the way support 12.

At the ends of the bed 10 adjacent to the ends 28 and 29 of the way support 12 there is provided a pair of tensioning blocks 31 and 32 which receive and securely hold the adjacent ends 26 and 27, respectively, of the ribbon way strip 24. The blocks 31 and 32 are identical, therefore, a description of one is deemed sufficient to adequate describe all of them. The blocks 31 and 32, as best shown in Figs. 3 and 5, are rectangular blocks of metal which are movably supported on base plates 34 secured, as by welding, to the top edge of end plates 36 of the bed 10. Brackets 37 welded or otherwise secured to the end plates 36 support the base plates 34 in a horizontal position.

For receiving the extending end 27 of the ribbon way strip 24 the block 32 is provided with a horizontally disposed transverse slot 38 which extends across a face 39 of the block which is adjacent to the end 29 of the way support 12. It is to be noted that a bottom surface 47 of the slot 38 is in the same horizontal plane as the top surface of the way support 12. Thus, the ribbon way strip 24 is maintained in a flat horizontal plane throughout its entire length to eliminate the possibility of objectionable stresses being set up at the ends of the way support. To secure the end 27 of the ribbon way strip 24 to the block 32 within the slot 38 a plurality of screws 41 are provided. The screws 41 are disposed in two parallel rows and are inserted in suitable openings 42 provided in the block 32 and pass through the end of the ribbon way strip within the slot 38. The ends of the screws 41 are threaded as at 43 to engage threaded sockets 44 provided in the bottom portion of the block 32. A filler pad 45 is inserted between the ribbon way strip 24 and the upper surface 46 of the slot 38 to prevent the end 27 of the ribbon way strip 24 from moving out of the horizontal plane.

To movably secure the block 32 on the base plate 34 a plurality of elongated transversely spaced openings 48 are provided in the block 32 through which holding screws 49 are inserted into threaded engagement with threaded screw receiving openings 50 provided in the base plate 34. Washers 51 are interposed between the top of the block 32 and the heads of the screws 49 to more effectively utilize the force exerted by the screws and to provide a slide surface upon which the top surface of the block 32 may slide. To move the block 32 away from the way support 12, in order to apply a tensioning force to the ribbon way strip 24, a horizontally disposed screw 52 is threadedly engaged in the block 32 midway between the sides thereof and in a manner that the end 53 thereof engages the end 29 of the way support 12 at a point which is disposed in the same vertical plane that the longitudinal axes of the way support 12 and ribbon way strip 24 are located.

In operation, the ends 26 and 27 of the ribbon way strip 24 are placed within the slots 38 of the tension blocks 31 and 32, respectively, and are secured therein by means of the screws 41. The holding screws 49 are then engaged into the base plate 34 with the heads thereof exerting a sufficient force upon the washers 51 so that the blocks 31 and 32 are firmly maintained on the base plate 34 but are still movable longitudinally thereon. The screws 52 are then threaded inwardly into the blocks so that the ends 53 thereof abut the respective ends of the way support and exert a force against them to effect movement of the blocks outwardly of or away from the way support.

Thus, the blocks 31 and 32, acting as whippletrees, apply a longitudinal tensioning force to the ribbon way strip 24 from both ends thereof. The tensioning force applied by each block 31 and 32 is equalized over the width of the ribbon way strip 24. The whippletree action of the tension blocks insure that a perfectly even bearing surface will be presented by the ribbon way strip and is, also, effective to maintain the ribbon way strip in position on the way support.

It is to be noted that the amount of longitudinal tension that can be applied by each block would be limited by the length of the openings 48 in the blocks 31 and 32 through which the holding screws 49 pass. Therefore, when the tensioning blocks have been moved away from the way support to the extent that the inner end of the openings 48 abut the holding screws 49, the tension block is clamped in that position by other means, such as by C-clamps (not shown). After the C-clamps or other means have been applied, the holding screws 49 with their associated washer 51 are removed and are reinserted through the openings 48 into other threaded openings 54 provided in the base plate 34 outwardly of the openings 50. The holding screws 49 are then snugly tightened against the block and the C-clamps or other means removed. The screws 52 then again may be actuated inwardly to apply an additional tensioning force on the ribbon way strip 24.

To prevent fluids, such as cutting fluids and lubricants, from accumulating between the ribbon way strip and the top supporting surface of the way support 12 simple and effective sealing means have been employed at the longitudinal edges of the ribbon way strip. To this end, and as best shown in Figs. 4 and 6, a pair of grooves 60 and 61 are provided in the top surface of the way support 12 and extend longitudinally thereof the entire length. The grooves 60 and 61 are so spaced that they are adjacent to the longitudinal edges of the ribbon way strip as shown in Figs. 4 and 6. A compressible sealer strip 62 of a suitable material such as "neoprene" or other suitable material is inserted in the grooves 60 and 61. The sealer strip in cross-section is of circular configuration and has a diameter which is somewhat greater than the depth of the groove. Hold down strips 63 and 64, which may be of a continuous length but which I prefer to be in sections for ease of handling, are employed to maintain the longitudinal edges of the ribbon way strip 24 in sealed engagement with the sealer strip 62.

The hold down strips 63 and 64 extend the length of the way support and bear on the outer edge of the way support adjacent to the longitudinal edge of the ribbon way support adjacent to the longitudinal edge of the ribbon way strip 24. The strips 63 and 64 are provided with a longitudinally extending recess portion 66, best shown in Fig. 6, which is disposed at the bottom and inner edge of the strip. The recess is of a dimension sufficient to just accommodate the thickness of the ribbon way strip 24, as shown in Fig. 6. The hold down strips are secured to the top surface of the way support by means of a plurality of screws 67 which are inserted through suitable openings in the strip into threaded engagement in the way support. The strips 63 and 64, when secured in place, insure that the longitudinal edges of the ribbon way strip are maintained in firm contact with the top surface of the way support thereby compressing the sealer strip 62 into oval configuration within the grooves to provide an effective sealing arrangement for the exclusion of fluids.

It has been found that notwithstanding the provision of a sealer for the longitudinal edges of the ribbon way strip, small amounts of fluid may be drawn by capillary attraction and accumulate between the ribbon way strip and the top supporting surface of the way support. The passage of the gantry shoes 17 and 18 over their respective ways tend to move the accumulated fluid in the direction of movement of the gantry and thereby build-up a hydrostatic pressure. The hydrostatic pressure under the ribbon way strip forces the ribbon way strip upwardly away from the bearing surface of the way support. This condition impairs the wearing qualities of the ribbon way strip and offers a resistance to the passage of the gantry shoes as well as causing inaccuracies in the operation of the machine tool. To eliminate this condition, a plurality of longitudinally spaced passages 69, as best shown in Fig. 2, are provided in the way supports 12 and 13. The passages 69 communicate with the top surface of the way supports and with a reservoir (not shown) or other suitable receptacles provided in the bed 10 of the machine tool. Thus, as the gantry shoes 17 and 18 move over their respective ribbon way strips the fluid accumulating under the way strips is exhausted through the passages 69 thereby preventing a building-up of a hydrostatic pressure.

To minimize the effect of friction between the gantry shoes 17 and 18 and their associated ribbon way strips 24, the shoes are provided with a non-metallic bearing plates is a plastic material with or without suitable bindfound that a material that can be used for these bearing plates is a plastic material with or without suitable binders since it has good wear resistant and low friction qualities. A description of only one of the gantry shoes will be given since both are constructed in the same manner. The gantry shoe 17 has a bottom face 72 to which is removably secured a backing plate 73 in a well known manner. The backing plate 73 carries the non-metallic bearing plate 71 on its under or outer face 74. The non-metallic bearing plate 71 is secured to the backing plate 73 by a suitable adhesive or by means of screws in a well known manner, to eliminate openings or brakes in a bearing surface 76 of the bearing plate.

To supply a lubricant to the area of the ribbon way strip 24 that is in immediate contact with the bearing surface 76 of the bearing plate 71 a plurality of lubricant dispensing grooves 77 are provided in the plate 71. The grooves 77 are formed in the contract face 76 and are longitudinally spaced over the length of the bearing plate 71. The grooves 77, as best shown in Fig. 4, extend transversely of the longitudinal axis of the bearing plate and extend to a point short of the sides thereof. A plurality of lubricant supply passages 78, are provided in the bottom face 72 of the shoe 17 and have communication with mating passages 79 provided in the backing plate 73. Likewise, the passages 79 register with passages 80 provided in the non-metallic bearing plate 71 which passages communicate wtih the lubricant dispensing grooves 77. Thus, a lubricant supplied to the surface of the ribbon way strip is maintained in the contact area so that the amount of lubricant between the members is maintained at a maximum. Also, the termination of the dispensing grooves 77 short of the sides of the bearing plate 71 will minimize the amount of lubricant that will seep out from the contact area, thus, controlling the build-up of the lubricant against the hold down strips 63 and 64, which lubricant would tend to be drawn by capillary action under the ribbon way strip.

From the foregoing detailed description of the improved bearing construction provided by the present invention, it will be apparent that the way construction in combination with the non-metallic bearing plate is especially adapted for supports of relatively great length on which is slidably supported movable members of considerable weight that travel at relatively high feed rates, and which is simple in application and is easily and inexpensively replaced.

Although the illustrative embodiment of the invention has been described in considerable detail for the purpose of setting forth an operative and practical exemplifying structure, it is to be understood that the structure shown and described is intended to be illustrative only and that various modifications of the construction may be made without departing from the spirit and scope of the invention as defined in the subjoined claims.

The principles of this invention having now been fully explained in connection with the foregoing description, I hereby claim as my invention:

1. In a machine tool having a bed, way supports formed in the bed, said way supports having openings extending therethrough for placing their supporting surfaces in communication with the interior of the bed, the openings being spaced along the length of said ways, a continuous ribbon way strip on said ways, said ribbon way strips having a finish that has been rolled smooth, tensioning blocks carried on said bed at each end of said ways, said tensioning blocks receiving the ends of said ribbon way strips, means carried by said tensioning blocks to move said tensioning means and thereby apply tension to said ribbon way strip from each end thereof, a reciprocating member having slide members receivable on said ribbon way strips, and non-metallic bearing plates secured to each of said reciprocating slide members to slidably support said reciprocating member on said ribbon way strip, whereby any fluid that may gain access to the underside of said way strips will be expelled through the openings in said way supports so that accurate movement of the movable member along the bearing surfaces of said way strips will be maintained.

2. In a machine tool, the combination of a bed having an elongated supporting surface on the upper side thereof, a reciprocable gantry on said bed, guide means on said gantry having mating engagement with said supporting surface of said bed, said guide means including a bearing plate receiving surface, a bearing plate of non-metallic material removably secured to said bearing plate receiving surface, said bearing plate having a plurality of spaced apart lubricant distributing grooves, said grooves extending across said bearing plate to a point short of the side of said bearing plate, individual means in communication with said grooves to supply lubricant thereto, a continuous cold rolled ribbon way strip mounted on said supporting surface of said bed and presenting a smooth unbroken bearing surface to slidably receive said non-metallic bearing plate of said gantry, means operable to secure one end of said ribbon way strip to said bed, a tensioning block movably mounted on said bed at the end of said supporting surface of said bed and operable to apply longitudinal tension to said ribbon way strip and to maintain said ribbon way strip on said supporting surface of said bed, and means operable to seal the joints between the supporting surface of said bed and the underside of said ribbon way strip at the longitudinal edges thereof.

3. In a machine tool having a bed and a movable member provided with guides, longitudinally extending way supports formed on the bed to slidably carry the movable member and having openings extending therethrough for placing their supporting surfaces in communication with the interior of the bed, the openings being spaced along the length of said way supports, a ribbon way strip mounted on each of said bed way supports to cover the top surface thereof, said ribbon way strips being of a material that presents a rolled smoothened hardened surface, said ribbon way strips being of a length to extend beyond the ends of said way supports, a plurality of blocks slidably carried on said bed as separate elements, said blocks being disposed at the ends of said way supports, means to adjustably secure said blocks to said bed in any desired position relative to the longitudinal axis of said way supports, each of said blocks having a slot disposed in a horizontal plane and extending across the face of said block which is adjacent to the end of said way support, said block being disposed to receive the extending ends of said ribbon way strips within the slots, means carried by said blocks to secure the extending ends of said ribbon way strips in the slots, adjustable means threadedly engaged in said blocks and extending therethrough into contact with ends of said way supports and operable when actuated to move said blocks away from said way supports to thereby exert a longitudinal tensioning on said ribbon way strips to maintain said ribbon way strips on said way supports in a smooth surface conforming manner, sealing means mounted along the longitudinal edges of said ribbon way strips to seal the juncture of the longitudinal edges of said ribbon way strips with said way supports for preventing the entrance of foreign matter between said way supports and said way strips, and a non-metallic bearing plate secured to each of said guides of said movable member and adapted to be in engagement with said ribbon way strips to slidably support said movable member on said bed, whereby foreign matter will be excluded from the underside of said way strips and any fluid that may gain access to the underside of said way strips will be expelled through the openings in said way supports so that accurate movement of the movable member along the bearing surfaces of said way strips will be maintained.

4. The combination with a machine tool bed having elongated way supports and a movable member receivable on said way supports, said bed way supports being constructed to predetermined desired dimensions, of a ribbon way strip for each of said way supports carried on the top surface thereof and having one end secured to said bed, tensioning blocks carried on said bed at the end of said way supports and receiving the free ends of said ribbon way strips, means to adjustably secure said blocks in an operable position adjacent to the ends of said way supports, operable means carried by said blocks to secure the ends of said ribbon way strips therein, operable means engaged in said blocks and engageable with the ends of said way supports to move said blocks away from said way supports to thereby apply a longitudinal tensioning force to said ribbon way strips to maintain said ribbon way strips on said way supports in a conforming relationship to provide a smooth hardened way surface therefor, said way supports being provided with a plurality of longitudinally spaced openings therein to provide an escape for fluid accumulating between the ribbon way strip supporting surface of said way supports and said ribbon way strips.

5. In a machine tool organization, the combination with a movable machine element and a bed having a way support thereon, of a cold rolled metallic ribbon way strip arranged on the way support and presenting a smooth continuous surface, said ribbon way strip having one end secured to the end of said way support, movable means on said bed at one end of said way support receiving and securely holding the free end of said ribbon way strip, operable means carried by said movable means to move said movable means away from said bed way support to thereby apply tension to said ribbon way strip, sealing means carried by said way support extending longitudinally thereof and adjacent the longitudinal edges of said ribbon way strip, means to maintain the longitudinal edges of said ribbon way strip in sealed engagement with said sealing means, of a non-metallic bearing plate removably secured to said movable member, said non-metallic bearing plate adapted to slidably support said movable member on the way support having said ribbon way strips thereon, said bearing plate having a plurality of transversely extending longitudinally spaced lubricant dispensing grooves provided in the ribbon way contacting surface thereof, said grooves extending to a point short of the longitudinal edges of said bearing plate, and individual lubricant supply means for each of said grooves.

6. In a machine tool organization, the combination of a bed having a way support thereon, a ribbon way surface for said way support covering substantially the entire supporting surface of said way support and extending beyond the ends thereof, means movably carried on said bed at each end of said way support to receive and securely hold the extending ends of said ribbon way strip adjacent thereto, said movable means being so constructed and arranged so as to maintain the extending ends of said ribbon way strip in the horizontal plane wherein the main portion of said ribbon way strip lies, operable means carried by said movable means to move said movable means away from said way support to thereby exert a force on said ribbon way strip from both ends thereof to maintain said ribbon way strip on the supporting surface of said way support in a smooth and conforming manner, sealing means carried by said way support extending longitudinally thereof and adapted to effect a seal between the longitudinal edges of said ribbon way strip and the supporting surface of said way support, said way support being provided with a plurality of longitudinally spaced openings to prevent the accumulation of fluid on said way support between the supporting surface thereof and said ribbon way strip, a movable member receivable on said way support for sliding movement thereon, said movable member having a non-metallic bearing plate adapted to be in bearing and sliding engagement with the ribbon way strip on said way support, said bearing plate having a plurality of longitudinally spaced lubricant dispensing grooves provided in the bearing surface of said bearing plate, said grooves extending across said bearing plae transversely to the direction of movement of said movable member and extending to a point short of the sides of said bearing plate whereby lubricant is applied to substantially all of the bearing surface of said ribbon way strip in immediate engagement with said bearing plate, and means to supply lubricant to said grooves.

7. In a machine tool having a bed and a movable member, way supports formed in the bed to slidably carry the movable member, a metallic ribbon way strip on each of said way supports presenting a smooth continuous bearing surface for slidably receiving the movable member, tensioning means carried by the bed at the ends of the way supports and operative to apply a longitudinal tensioning force to said ribbon way strips to maintain said ribbon way strips taut along their cooperating way supports, and sealing means mounted along the longitudinal edges of said ribbon way strips to seal the juncture of the longitudinal edges of said ribbon way strips with said way supports for prevening the entrance of foreign matter between said way supports and said way strips, whereby said way strips present replaceable bearing surfaces which accurately support the movable member for sliding movement.

8. In a machine tool having a bed and a movable member way supports formed on the bed to slidably carry the movable member, said way supports having openings extending therethrough for placing their supporting surfaces in communication with the interior of the bed, the openings being spaced along the length of said way supports, a metallic ribbon way strip on each of said way supports presenting a smooth continuous bearing surface for slidably receiving the movable member, tensioning means carried by the bed at the ends of said way supports and operative to apply a longitudinal tensioning force to said ribbon way strips to maintain said ribbon way strips taut along the supporting surface of their cooperating way supports, and sealing means mounted along the longitudinal edges of said ribbon way strips to seal the juncture of the longitudinal edges of said ribbon way strips with said way supports for preventing the entrance of foreign matter between said way supports and said way strips, whereby said way strips present replaceable bearing surfaces which accurately support the movable member for sliding movement.

9. In a machine tool having a bed and a movable member, way supports formed on the bed to slidably carry the movable member and having openings extending therethrough for placing their supporting surfaces in communication with the interior of the bed, the openings being spaced along the length of said way supports, each of said way supports having a groove formed along both longitudinal edges; a resilient compressible sealer strip in each of the grooves and extending along the entire length of the grooves, said sealer strips having a cross sectional height greater than the height of said grooves so that said sealer strips normally protrude from said grooves above the supporting surface of said way supports but being compressible to be fully contained within the grooves, a metallic ribbon way strip on each of said way supports presenting a smooth continuous bearing surface for slidably receiving the movable member with the extremities of said way strips overlying said sealer strips, tensioning means carried by the bed at the ends of said way supports and operative to apply a longitudinal tensioning force to said ribbon way strips to maintain said ribbon way strips taut along the supporting surface of their cooperating way supports, and hold down strips mounted along both longitudinal edges of each of said way supports and extending along the length of said way supports with the inner edge of said hold down strips overlying the longitudinal edges of said way strips to force the longitudinal edges of said way strips into engagement with the supporting surface of said way supports and thereby compress said sealer strips into their cooperating grooves to form a seal between said ribbon way strips and said way supports for preventing the entrance of foreign matter beneath said way strips, whereby foreign matter will be excluded from the underside of said way strips and any fluid that may gain access to the underside of said way strips will be expelled through the openings in the said way supports so that accurate movement of the movable member along the bearing surfaces of said way strips will be maintained.

References Cited in the file of this patent

UNITED STATES PATENTS

| | | |
|---|---|---|
| 1,245,324 | Droitcour | Nov. 6, 1917 |
| 1,903,865 | Johnson | Apr. 18, 1933 |
| 2,635,930 | Daugherty | Apr. 21, 1953 |
| 2,844,416 | Zaveruha | July 22, 1958 |

FOREIGN PATENTS

| | | |
|---|---|---|
| 880,839 | Germany | June 25, 1953 |

UNITED STATES PATENT OFFICE
CERTIFICATE OF CORRECTION

Patent No. 2,959,452                          November 8, 1960

Theodore A. Wetzel

It is hereby certified that error appears in the above numbered patent requiring correction and that the said Letters Patent should read as corrected below.

Column 3, line 32, for "pair" read -- repair --; line 64, for "adequate" read -- adequately --; column 5, line 69, for "plates is a plastic material with or without suitable bind-" read -- plate 71, as best shown in Figs. 2 and 4. It has been --; column 8, line 74, for "plae" read -- plate --; column 9, lines 23 and 24, after "member" insert a comma.

Signed and sealed this 24th day of October 1961.

(SEAL)
Attest:

ERNEST W. SWIDER
Attesting Officer

DAVID L. LADD
Commissioner of Patents

USCOMM-DC